United States Patent [19]

Lin et al.

[11] Patent Number: 4,869,885
[45] Date of Patent: Sep. 26, 1989

[54] USE OF OIL-SOLUBLE SURFACTANTS IN FLUE GAS DESULFURIZATION SYSTEMS

[75] Inventors: Mai-Jan L. Lin, Naperville; Richard J. Mouche', Batavia, both of Ill.

[73] Assignee: Nalco Chemical Company, Naperville, Ill.

[21] Appl. No.: 123,471

[22] Filed: Nov. 20, 1987

[51] Int. Cl.$^4$ ............................................. C01B 17/00
[52] U.S. Cl. .................................. 423/242; 423/242
[58] Field of Search ................................ 423/242, 243

[56] References Cited

U.S. PATENT DOCUMENTS

| 4,049,775 | 9/1977 | Majewska et al. | 423/243 |
| 4,291,004 | 9/1981 | McCaffrey et al. | 423/242 |
| 4,741,890 | 5/1988 | Rose et al. | 423/243 |
| 4,795,620 | 1/1989 | Heisel et al. | 423/243 |

FOREIGN PATENT DOCUMENTS

| 4018488 | 2/1979 | Japan | 423/243 |
| 4072762 | 6/1979 | Japan | 423/243 |

OTHER PUBLICATIONS

McCutcheon's Detergents & Emulsifiers, North American Edition, Published by McCutcheon Div., MC Publishing Co., 1978.

"The HLB System" Published by ICI Americas, Inc., 1976.

"Improvement of Fly Ash Alkali Utilization in FGD Systems" by M. Lin, R. Mouch', E. Ekis & P. Nassos of Nalco Chemical Company presented at the American Power Conference, Apr. 27–29, 1987.

"Effect of Organic Acid Additivies on $SO_2$ Absorption into $CAO/CACO_3$ Slurries", Aiche Journal, vol. 28, No. 2, Mar. 1982, pp. 261–266.

"$SO_2$ Absorption into Aqueous Solutions", C. S. Chang & G. T. Rochelle, Aiche Journal, vol. 27, No. 2, Mar. 1981, pp. 292–298.

Enhancement of Flue Gas Desulfurization Systems Applied to Coal Fired Utility Boilers, R. D. Delleney, O. W. Hargrove & J. D. Cooley, Radian Corporation.

"The Adipic Acid Enhanced Limestone Flue Gas Desulfurization Process", J. D. Mobley & J. C. S. Chang, Journal of the Air Pollution Control Assn., Dec. 1981, vol. 31, No. 12.

"FGD Improves with Adipic Acid", Power, Jul. 1982.

"Testing & Commercialization of Byproduct Dibasic Acids as Buffer Additives for Limestone Flue Gas Desulfurization Systems", reprinted from APCA Jounal, vol. 33, No. 10, Oct. 1983, Journal of the Air Pollution Control Assn., Oct. 1983, vol. 33, No. 10.

"Limestone/Adipic Acid FGD & Stack Opacity Reduction Pilot Plant Tests at BIC Rivers Electric Corporation", by D. Laslo & E. Bakke, Peabody Process Systems, Inc., Norwalk, Ct. and E. Chisholm, Big Rivers Electric Corp., Sebree, Ky.

*Primary Examiner*—Asok Pal
*Attorney, Agent, or Firm*—John G. Premo; Anthony L. Cupoli; Donald G. Epple

[57] ABSTRACT

A method of improving the $SO_2$ scrubbing efficiency of flue gas desulfurization scrubbers which comprises conducting the scrubbing operation in such scrubbers in the presence of an oil-soluble surfactant.

5 Claims, 3 Drawing Sheets

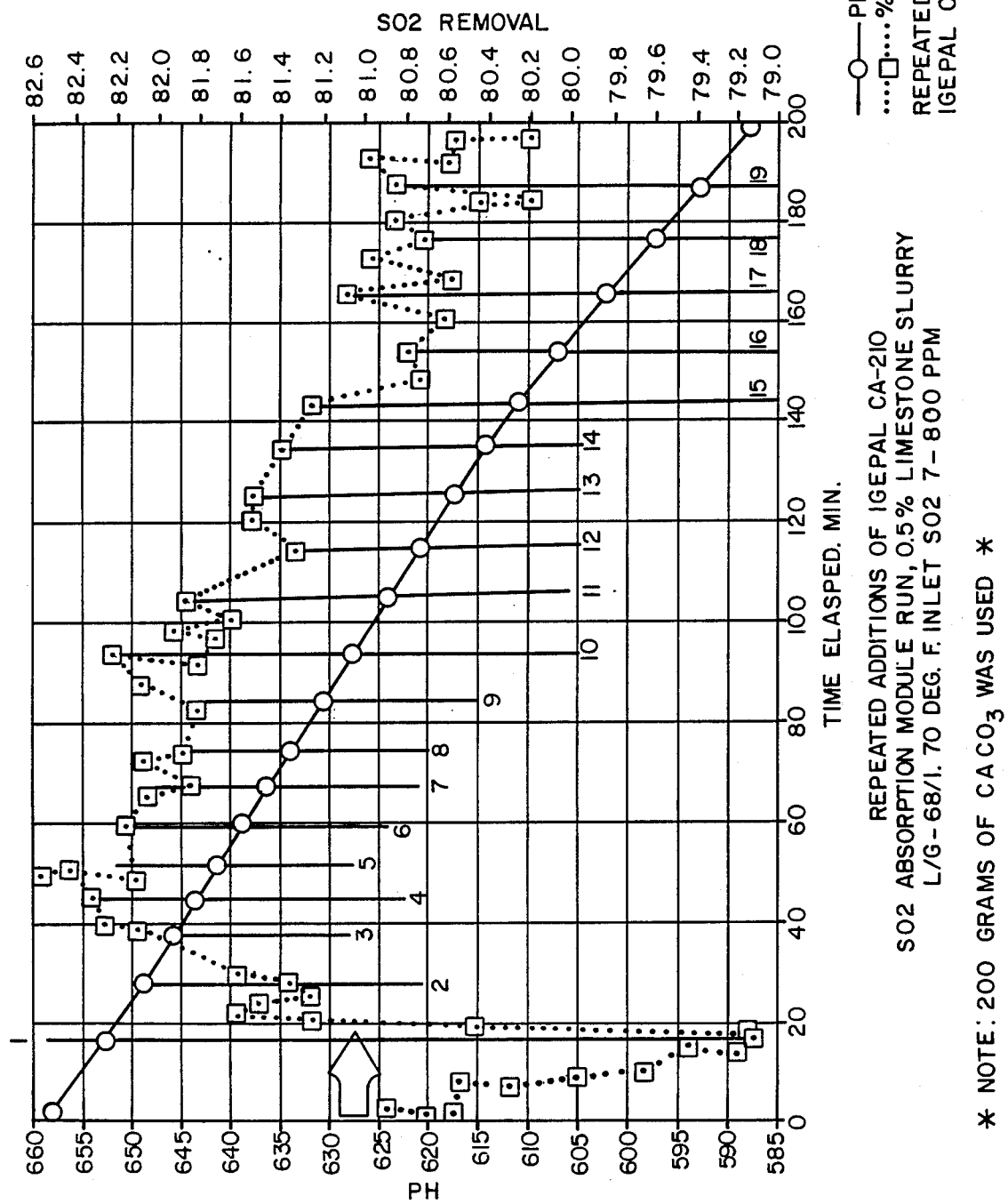

USE OF OIL-SOLUBLE SURFACTANTS IN FLUE GAS DESULFURIZATION SYSTEMS

Flue gases from utilities and industrial boilers are subject to wet scrubbers to remove $SO_2$ therefrom. This Flue Gas Desulfurization (FGD) process operates using a basic neutralizing substance such as lime, limestone or fly ash.

Sulfur dioxide removal efficiency is the key measure of any desulfurization process. More cost-efficient $SO_2$ removal can result in substantial savings in reagent utilization, energy consumption, equipment protection, and solids disposal. Improved $SO_2$ removal efficiency is a necessity for scrubbers operating at the margins of emission requirements. Improved efficiency is needed in all FGD scrubbers, and is espically important for limestone slurry systems since the stoichiometric efficiency of limestone is normally poor.

Organic acids such as dibasic acid (DBA) have been used as buffering/solubilizing agents to increase limestone slurry scrubbing efficiency. Although this technology has been known for some time, it is practiced by only a few power plants. Inexpensive waste DBA products are obtained from Nylon and cyclohexanone manufacturing processes.

Being a waste stream mother liquor, these DBA products suffer from non-uniformity of composition as well as precipitation and degradation. These problems add to the already inefficient high dosage requirements (typical 1,000–7,000 ppm continuous feed). DBA also solidifies at ambient temperature and seems to cause foaming in the scrubber. Concentration DBA must be kept hot during transportation at 212–266° F.(100–130° C.) until reacting with scrubbing liquid.

Dibasic acids serve a dual function in the enhancement of $SO_2$ scrubbing. The acid functionality helps solubilize calcium carbonate particles into slurry liquid. Also, their characteristic pKa values (e.g. adipic acid, $pKa_1 = 4.26$, $pKa_2 = 5.03$) are generally in the pH control range of the recycled slurry. This provides extra buffer capacity to the bulk liquid.

It is therefore an object of the invention to develop products which improve $SO_2$ removal and calcium carbonate dissolution more efficiently than DBA.

THE INVENTION

The invention is directed to a method of improving the $SO_2$ scrubbing efficiency of FGD scrubbers. The method comprises treating these scrubbers during the scrubbing operations with an oil-soluble surfactant. The efficiency of the process is evidenced when the scrubbers contain lime, limestone or fly ash.

The oil-soluble surfactants usable in the practice of the invention usually have an HLB within the range of 1–9 with a preferred HLB range being 1–5.

In most instances, the preferred surfactants are non-ionic. A large number of surfactants usable in the invention as well as their HLB numbers are described in *McCutcheons's Detergents & Emulsifiers, North American Edition*, published by McCutcheon Division, Mc Publishing Co., 1978. For a more detailed description of the HLB, see "The HLB, System" published by ICI Americans, Inc., 1976. Both of these publications are incorporated herein by reference.

The amount of surfactant used to treat the scrubbers is generally within the range of 0.1 to 500 ppm, or more preferably from 2 to 200 ppm based upon total weight or volume of the slurry.

The invention was evaluated using a laboratory scale FGD scrubber simulator.

BRIEF DESCRIPTION OF THE DRAWINGS

FIG. 3 represents $SO_2$ absorption module data, 0.5% limestone slurry, with repeated additions of IGEPAL CA-210 surfactant.

PROCEDURE

The $SO_2$ absorption module, or mini-scrubber, test design and operation are described in the paper "Improvement of Fly Ash Alkali Utilization in FGD Systems" by M. Lin, R. Mouche's, E. Ekis, and P. Nassons of Nalco Chemical Company, presented at the American Power Conference, April 27–29, 1987.

The mini-scrubber is typically run with 40 liters of slurry, 0.5% 1.5% solids concentration, ambient or 110° F., 5 cfm gas flow (mixed with air), and 700–2,500 ppm inlet $SO_2$ concentrations. Laboratory tap water of 300 'M' alkalinity was used to make up the slurry. Water analysis of a typical 1.5% limestone slurry at pH 6.2 is given in Table I. Several operating modes were used during this research.

TABLE I

| Water Analysis of a 1.5% Limestone Slurry | |
|---|---|
| Ions | ppm |
| Sodium (Na) | 230 |
| Potassium (K) | <0.1 |
| Boron (B) | 0.3 |
| Total Sulfur (S) | 420 |
| Total Silica | 18 |
| Calcium (Ca) | 390 |
| Magnesium (Mg) | 23 |
| Copper (Cu) | 0.04 |
| Manganese (Mn) | 0.18 |
| Strontium (Sr) | 0.60 |
| Zinc (Zn) | 0.07 |

A. Without Supplemental Alkalinity During the Run

Figure 1:
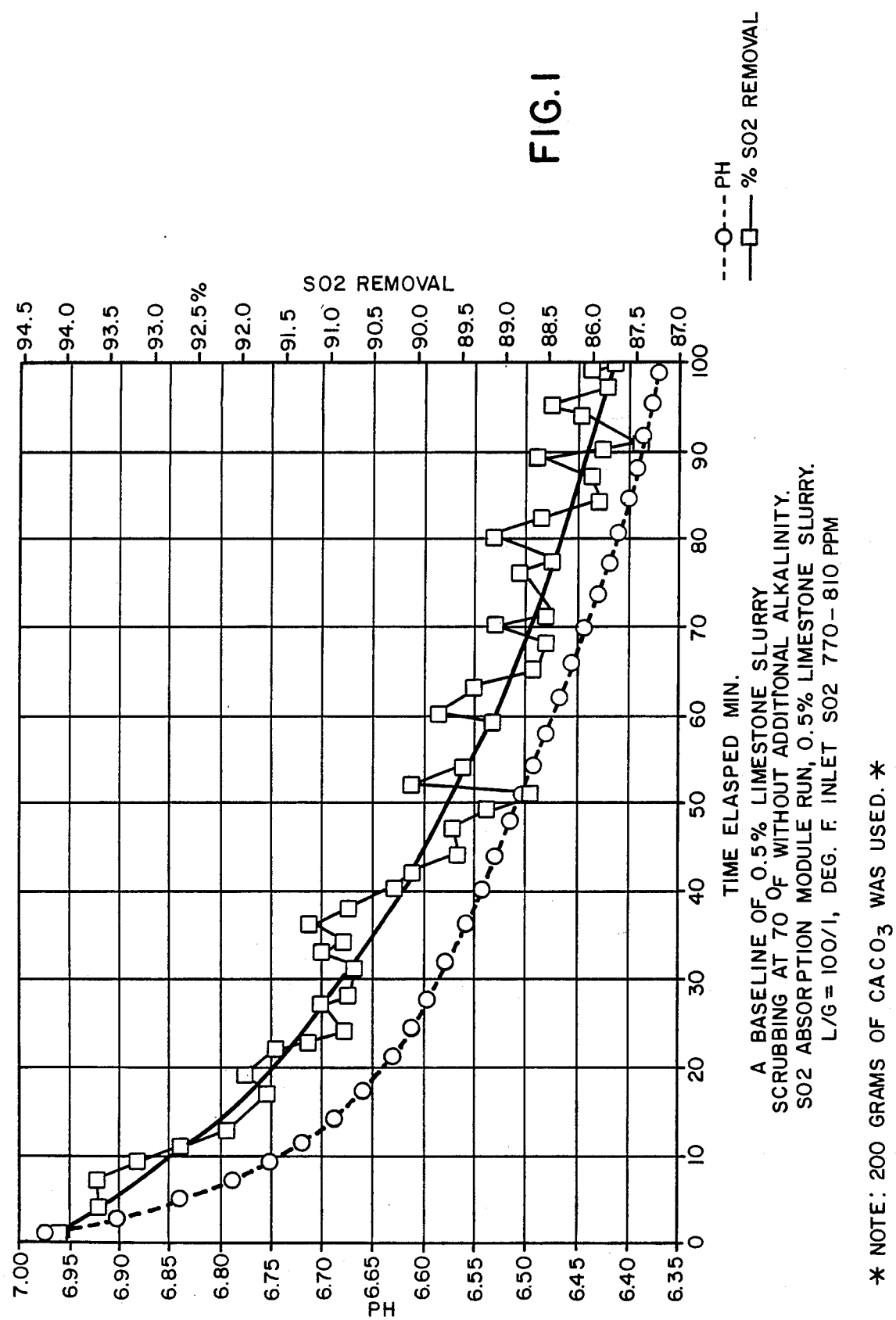
FIG. 1 represents a baseline of 0.5% limestone slurry scrubbing at 70° F. without additjional alkalinity.

Most of the screening was accomplished by slurry scrubbing with no additional alkalinity added during the experiment. Continual reduction of both slurry pH and %$SO_2$ removal as a function of time are expected. Up to six additives are introduced at 10 min. intervals (minimum) and at slury pH value between 5.5 and 6.5. Since a constant decrease in %$SO_2$ removal is normal with decreased slurry pH, a positive effect of an additive is indicated by an increase or leveling-off of %$SO_2$ removal. An example of the baseline result is shown in FIG. 1.

B. Higher Temperature Testing

Most of the surfactant screening was conducted at ambient temperature to minimize the time needed to heat up the slurry. A number of experiments were conducted at 110° F., which more closely simulates operating scrubber temperatures.

C. pH-Stat and Lime Consumption Rate Measurement

When operating in the pH-stat mode, a pH controller and a supplemental reagent feed pump were used. A 2.0% wt. lime (reagent grade) slurry was used as supplemental reagent. Lime consumption rates were recorded generally every 5–10 min.

D. Repeated Additions of a Surfactant

A few experiments were performed with repeated additions of the same surfactant. A given quantity of surfactant (usually 25 or 50 ppm) was added repeatedly at fixed time intervals (usually every 10 or 20 min.) until the slurry pH fell below 5.5.

A few experiments were run with limestone slurries at a higher solids level (1.5% or 600 grams) or higher inlet $SO_2$ (up to 2,500 ppm). Most of these experiments were conducted with varying $CaCo_3$ types and particle sizes. Lime slurries of 0.05% wt. were made up with lime. A lower (20 grams) concentration of lime was used to speed up the experimint due to the high alkalinity of the lime slurry.

Most of the laboratory scrubber simulator results are represented in as pH ($Y_1$ axis) and $%SO_2$ removal ($Y_2$ axis) v.s. elapsed experimental time. The zero elasped time is an arbitrary starting time selected to show the significance of results.

RESULTS AND DESCUSSION

A. Baseline Conditions

For runs during which no additional alkalinity was introduced, decreases in pH and $%SO_2$ removal with time are normal for the baseling (see FIG. 1). Due to continual $SO_2$ absorption in the recirculating reagent slurry, the slurry becomes more acidic with time. Decreasing slurry pH results in decreased $SO_2$ solubility and absorption under regular operating conditions.

B. Testing of Organic Acids

Since organic acids are known to cause an improvement in $SO_2$ removal, they were evaluated to demonstrate the reproducibility of field observations in the laboratory.

Typically, organic acid addition caused an immediate decrease of slurry pH, which subsequently recovered (within 5 min.) to almost its original value. Simultaneously, there was an acceleration in the rate of increase of the solution conductivity. The conductivity increase upon organic acid addition is due to increased calcium ion levels from additional limestone dissolution.

C. Testing of Oil-Soluble Surfactants

Figure 2:
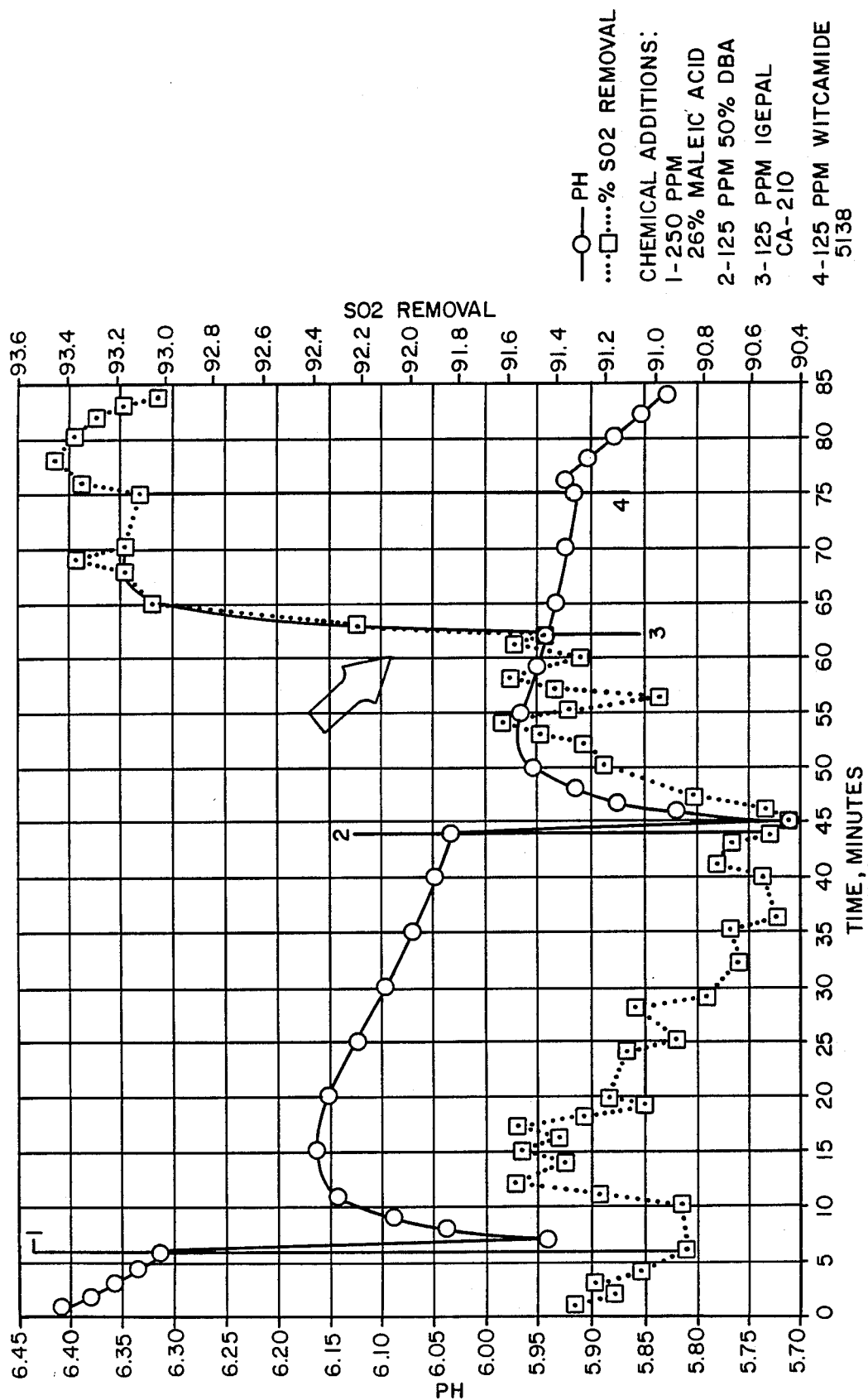
FIG. 2 represents the $SO_2$ absorption module data, with 0.5% limestone slurry, surfactant used following organic acids.

1. Ambient Temperature Testing of Non-ionic Surfactants Without Supplemental Alkalinity It was first noted that addition of a nonionic surfactant named IGEPAL CA-210 to limestone slurry at ambient temperature substantially increased $SO_2$ removal, when addition followed organic acid additions (see FIG. 2). The $SO_2$ removal improvement by the surfactant after organic acid addition was larger than that obtained with organic acids alone. Surfactant application was effective even at lower available regent levels. These same positive results were noted with the use of a recycle ash slurry. IGEPAL CA-210 is octylphenoxyl polyethyleneoxide ethanol, a nonionic surfactant with an HLB of 3.5. Tests were run to characterize effective surfactants by their types and hydrophilic/lipophilic balance (HLB) values. Tests results showed positive effects with blends of nonionic surfactants at HLB 2 and 4 while the fabvorable effect starts to diminish at HLB 8. Hence, low HLB, hydrophobic surfactants appeared to be most effective.

Screening of a large number of surfactants followed, with the emphasis on hydrophobic nonionic types. A few hydrophilic surfactants were also tested to verify the predicted negative results. A summary of the test results in terms of enhancement, on effect, or negative effect on $SO_2$ removal is given in Table II.

TABLE II

| Summary of Surfactant's Preformance in $SO_2$ Wet Scrubbers Using Limestone Slurry | | |
|---|---|---|
| Positive Effect | No Effect | Negative Effect |
| HLB=2 (SPAN's) | HLB=8 (SPAN & TWEEN) | |
| HLB=4 (SPAN's) | | |
| IGEPAL CO-210 | IEGPAL DM-430, 530, | IGEPAL CA-420, 520 |
| IGEPAL CA-210 | IGEPAL DM-710 | IGEPAL CA-620 |
| IGEPAL RC-630 | IGEPAL RC-520 | |
| IGEPAL CA-630 | IGEPAL CO-890, 990 | |
| SPAN 20 | SPAN 60 (solids) | |
| SPAN 85 | SPAN 65 | |
| | TWEEN 60 | TWEEN 80 |
| | TX-4156 | JOY detergent |
| | ALIPAL CD-128 | ALIPAL AB-436 |
| | IGEPON T-33 | |
| | PVP K-30 | |
| TRITON CF-10 | | TRITON X-114 |
| TRITON GR-7M | TRITON X-155 | |
| TRITON X-15 | | |
| R-2177 DOSS | TRITON CF-32 | TRITON N-42, N-57 |
| | TRITON N-60 | |
| | TRITON DF-12 | |
| TETRONIC 701 | TETRONIC 704 (2) | |
| TETRONIC 70R1, 110R1 | | |
| TETRONIC 90R1, 130R1 | | |
| TETRONIC 150R1 | | |
| TETRONIC 70R2 | TETRONIC 25R8, 150R8 | |
| | TETRONIC 908 | |
| TETRONIC 70R4 | TETRONIC 50R4, 90R8 | |
| TETRONIC 90R4 | | |
| TETRONIC 150R4 | TETRONIC 110R7 | |
| TETRONIC 1304, 1502 | | |
| | PLURONIC F77, F68 | PLURACOL E400 |
| | PLURONIC L35 | PLURONIC L31 |
| | PLURONIC L62D | |
| | PLURONIC L72 | |
| | PLURONIC 25R1 | PLURONIC L101 |
| | PLURAFAC RA-40 | |
| | PLURAFAC A-24 | |

TABLE II-continued

Summary of Surfactant's Preformance in SO₂ Wet Scrubbers Using Limestone Slurry

| Positive Effect | No Effect | Negative Effect |
|---|---|---|
| | PLURACOL P-410 | |
| | GAFAC RM-410, RS-410 | GAFAC RE-410 |
| | GAFAC BI-750 (rxn) | |
| | acidic | ANTARA LE-700 |
| | | ANTARA LM-400 |
| | | ANTARA HR-719 |
| | | ANTARA LK-500 |
| | ANTROX BL-214 | |
| ARLACEL 83 | ARLACEL 60 | ARLACEL 165 |
| | ATMUL 500 | |
| | ATSURF 2802 | |
| | MYRJ 53 | |
| | NIAX POLYOL LHT-240 | |
| ALFONIC 1012-60 | ALFONIC 1214-70 | SURFONIC LF-17 |
| | | EMPHOS PS-220 |
| | EMULPHOGENE BC-610 | |
| | EMULPHOGENE BC-420 | |
| | NEKAL NF | |
| | NEKAL WT-27 | |
| | DOSS OT-100 | |
| | Hystrene 3695 | |
| | Niax Polyol | |
| | BRIJ 30 | BRIJ 93 |
| | BRIJ 52 | |
| WITCAMIDE 5138 | AMP-95 (R-2233) | Ethoduomeen T-13 |
| WITCONOL 14 | | |
| Mackamide NOA | Mackamide Ole. DEA | |
| Mackamide Soyamide DEA | | |
| KELIG 3000 | | |

The most effective surfactants were those classified as hydrophobic, oil-soluble/water insoluble, oninionic types with HLB's typically in the range of 1-5. These are available under the commerical names IGEPAL CA-210, CO-210, TRITON X-15, ARLACEL 83, SPAN 85, TETRONIC 701 and TETRONIC 70R1, 90R1, 110R1, 150R1, among others.

Nonionic alkanolamides (Witcamide 5138, Witconol 14, and Mackamides) also exhibited some activity. Kelig 3000, a carboxylated lignosulfonate made by Reed Lingin, was also shown to be effective, probably due to ligninsulfonate's hydrophobicity. Anionic dioctylsodium sulfosuccinate (DOSS) also gave positive results.

The degree of SO₂ removal enhancement varied between 1% and 30% due to variations in operating conditions. Effective TETRONIC surfactants, due to their basicity, also caused a pH increase which was rarely observed with the use of other surfactants.

Some surfactants were tested with a higher solids (1.5%) limestone slurry. The responses were generally slightly more favorable than those obtained at the lower solids level (0.5%). Due to the higher alkalinity and buffering capacity in the high solids slurry, these experments take 3-5 hours to reach a pH of 6.2. Therefore, this mode of operation was not employed for the majority of the testing.

2. Applicability to Lime and Ash Slurry Systems

Limestone and lime slurry systems together occupy approximately 70-80% of the wet FGD scrubber market. About 10% of the market uses fly ash alone or in conjunction with lime or limestone reagents. Ash is often used with lime or limestone in spray dryer "dry" scrubbing of SO₂. The use of surfactants with lime and ash slurry will improve significantly SO₂ removal in both wet and dry scrubber technologies.

The surfactants found to be effective in the limestone slurry scrubbing were also found effective with lime and ash slurries. Significant improvements in SO₂ removal were obtained using IGEPAL CO-210, TRITON X-15, ARLACEL 83, IEGPAL CA-210. An experiment run with tap water only (300 'M' alkalinity) exhibited no improvement in SO₂ removal after ARLACEL 83 addition. This indicates the necessity of the presence of lime for the surfactant to function as SO₂ scrubbing enhancer. The enhancement could be accomplished through increased mass transfer at both the gas/liquid and/or the gas/solid interphase. Since 0.05% (20 grams) of lime is highly soluble in water, gas/liquid mass transfer enhancement should be dominate in this situation.

It was also encouraging to discover that these sufactants enhanced SO₂ removal when applied to other ash samples. The ash slurries tested include both recycle ash, inlet fly ash, plus spray dryer inlet and outlet ash. TETRONIC 701 and ARLACEL 83, like IGEPAL CA-210 and CO-210, also gave positive pH increases when added to the ash slurries.

3. Repeated Additions of Surfactant to Limestone Slurry

It was of interest to determine the surfactant saturation dosage at which additional surfactant addition becomes ineffective. This might serve to help establish reaction mechanism. Experiments were conducted with repeated additions of the same surfactants.

The saturation values for both TRITON X-15 and ARLACEL 83 appeared at 75-100 ppm, regardless of limestone slurry concentration (0.5% or 1.5%).

Frequent additions of small dosages of IGEPAL CA-210 resulted in sustained higher SO₂ removal efficiencies (see FIG. 3). This suggests that this surfactant can be continuously fed to obtain sustained higher SO₂ removal efficiencies.

4. Testing at Higher Temperature Using Limestone Slurry

Experiments were also conducted at 110° F., a temperature similar to actual wet scrubbing temperatures in the field. Higher temperature testing was of interest because the surfactant cloud point is a concern with respect to product stability and performance.

Testing with IGEPAL CA-210 and IGEPAL CO-210 indicated excellent performance at 110° F. Also, an increase in the slurry flow rate at the select pump throughput settings was noted at the end of the run, probably due to thinning of the slurry particles by both heat and surfactant.

The use of surfactants appeared to be more effective at 110° F. than at ambient temperature. Addition of TRITON X-15 and TETRONIC 701 increased $SO_2$ removal by 10% –20%. TETRONIC 701 and 90R1 gave smaller increases.

D. Testing of Hydrophilic and Other Ineffective Surfactants

It was important to evaluate surfactants that have characteristics opposite to those desired, in order to confirm and contrast the previous results.

Anionic surfactants as a category, with the exception of DOSS and carboxylated lignosulfonate (Kelig 3000), were ineffective at enhancing $SO_2$ removal. In addition, most of the hydrophilic anionic surfactants tested gave negative results. An example of this is TWEEN 80 (nonionic, HLB 15.0) which caused a significant decrease in $SO_2$ removal. Water soluble PLURACOL E400, in the same experiment, also caused a significant decrease. Furthermore, foam problems were associated with these higher HLB, water soluble surfactants.

Anionic phosphate surfactants, E.G. GAFAC's, ANTARA LK-500, and EMPHOS not only decrease $SO_2$ removal, but also reacted with the slurry. Cationic Nalco 603 (polyamine) showed negative effect during testing. Cationic surfactants were not extensively tested. Few were available for testing, and there is some concern about quadamine toxicicity.

The various surfactants named herein are described in the glossary:

TABLE 2
GLOSSARY
SURFACTANTS USED IN $SO_2$ ABSORPTION MODUELE TESTING

| Name | Chemical Structure | HLB | T*1 | M**2 | Form |
|---|---|---|---|---|---|
| SPAN 20 | Sorbitan monolaurate | 8.6 | N | ICI | liq[3] |
| SPAN 40 | Sorbitan monopalmitate | 6.7 | N | ICI | liq |
| SPAN 60 | Sorbitan monostearate | 4.7 | N | ICI | liq |
| SPAN 65 | Sorbitan tristearate | 2.1 | N | ICI | liq |
| SPAN 80 | Sorbitan monooleate | 4.3 | N | ICI | liq |
| SPAN 85 | Sorbitan trioleate | 1.8 | N | ICI | liq |
| HLB=2 | 8% SPAN 80 + 92% SPAN 85 | 2.0 | N | ICI | liq |
| HLB=4 | 88% SPAN 80 + 12% SPAN 85 | 4.0 | N | ICI | liq |
| HLB=8 | 65% SPAN 80 + 35% TWEEN 80 | 8.0 | N | ICI, Atlas | liq |
| ARLACEL 60 | Sorbitan monostearate | 4.7 | N | ICI | s |
| ARLACEL 83 | Sorbitan sequioleate | 3.7 | N | ICI | liq |
| ARLACEL 165 | Glycerol monostearate POE stearate | 11.0 | N | ICI | s |
| BRIJ 30 | POE (4) lauryl ether | 9.7 | N | ICI | liq |
| BRIJ 52 | Polyoxyethylene (2) cetylether | 5.3 | N | ICI | s |
| BRIJ 93 | Polyoxyethylene (2) oleylether | 4.9 | N | ICI | liq |
| MYRJ 53 | Polyoxyethylene (50) stearate | 17.9 | N | ICI | liq |
| ATMUL 500 | | 2.5 | N | ICI | liq |
| ATSURF 2802 | Butylated hydroxyanisole | 3.5 | N | ICI | s |
| TWEEN 60 | POE (20) sorbitan monostearate | 14.9 | N | Atlas | wax |
| TWEEN 80 | POE (20) sorbitan monooleate | 15.0 | N | Atlas | liq |
| TRITON N-42 | Nonylphenoxypoly(EO) ethanol | 9.1 | N | Rohm & H | liq |
| TRITON N-57 | Nonylphenoxypoly(EO) ethanol | 10.0 | N | Rohm & H | liq |
| TRITON N-60 | Nonylphenolpoly(EO) ethanol | — | N | Rohm & H | liq |
| TRITON X-15 | Octylphenoxypolyethyoxyethanol | 3.6 | N | Rohm & H | liq |
| TRITON N-114 | Octylphenolethyoxylate | 12.4 | N | Rohm & H | liq |
| TRITON N-155 | Alkylarylpolyether alcohol | 12.5 | N | Rohm & H | 90% l |
| TRITON DF-12 | Modified POE linear alcohol | 10.6 | N | Rohm & H | liq |
| TRITON GR-7M | Dicotylsodium sulfosuccinate (DOSS) | — | A | Rohm & H | 67% l |
| TRITON CF-10 | Alkylaryl polyether | 14.0? | N | Rohm & H | liq |
| TRITON CF-21 | same as above | — | N | Rohm & H | liq |
| TRITON CF-32 | same as above | — | N | Rohm & H | liq |
| TETRONIC 701 | block copolymers of EO & PO | 3.0 | N | BASF W | liq |
| TETRONIC 702 | same as above | 7.0 | N | BASF W | liq |
| TETRONIC 704 | same as above | 15.0 | N | BASF W | liq |
| TETRONIC 901 | same as above | 2.5 | N | BASF W | liq |
| TETRONIC 808 | same as above | 30.5 | N | BASF W | s |
| TETRONIC 50R4 | block copolymers of EO & PO | 8.9 | N | BASF W | liq |
| TETRONIC 70R2 | same as above | 4.8 | N | BASF W | liq |
| TETRONIC 70R4 | same as above | 7.9 | N | BASF W | liq |
| TETRONIC 90R4 | same as above | 7.1 | N | BASF W | liq |
| TETRONIC 90R8 | same as above | 12.9 | N | BASF W | s |
| TETRONIC 110R7 | same as above | 9.5 | N | BASF W | s |
| TETRONIC 150R4 | same as above | 5.4 | N | BASF W | pas |
| TETRONIC 150R8 | same as above | 11.2 | N | BASF W | s |
| TETRONIC 70R1 | same as above | 2.9 | N | BASF W | liq |
| TETRONIC 90R1 | same as above | 2.4 | N | BASF W | liq |
| TETRONIC 110R1 | same as above | 1.9 | N | BASF W | liq |
| TETRONIC 130R1 | same as above | 1.4 | N | BASF W | liq |
| TETRONIC 150R1 | same as above | 1.0 | N | BASF W | liq |
| TETRONIC 1304 | block copolymers of PO & EO | 13.5 | N | BASF W | pas |
| TETRONIC 1502 | same as above | 5.0 | N | BASF W | liq |
| PLURONIC F68 | block copolymers of PO & EO | 30.5 | N | BASF W | liq |

2-continued
GLOSSARY
SURFACTANTS USED IN SO₂ ABSORPTION MODUELE TESTING

| Name | Chemical Structure | HLB | T*¹ | M**² | Form |
|---|---|---|---|---|---|
| PLURONIC F77 | same as above | 24.5 | N | BASF W | s |
| PLURONIC 25R1 | same as above | 4.0 | N | BASF W | liq |
| PLURONIC 25R8 | same as above | 12.1 | N | BASF W | s |
| PLURONIC L31 | same as above | 18.5 | N | BASF W | liq |
| PLURONIC L35 | same as above | 8.0 | N | BASF W | liq |
| PLURONIC L62D | same as above | 7.0 | N | BASF W | liq |
| PLURONIC L72 | same as above | 6.5 | N | BASF W | liq |
| PLURONIC L101 | same as above | 1.0 | N | BASF W | liq |
| PLURAFAC RA40 | Linear alcohol alkoxylates | 7.0 | N | BASF W | liq |
| PLURAFAC A-24 | same as above | 5.0 | N | BASF W | liq |
| PLURACOL E400 | Polyethylene glycol, MW 400 |  | N | BASF W | liq |
| PLURACOL P410 | Polyethylene glycol | — | N | BASF W | liq |
| GAFAC RE-410 | Free acid of complex organic | — | A | GAF | s |
| GAFAC BI-750 | phosphate ester | — | A | GAF | liq |
| GAFAC RM-410 | same as above | — | A | GAF | s |
| PVP K30 | Polyvinylpyrrolidone 30,000 MW |  |  | GAF | s |
| EMULPHOGENE |  |  |  |  |  |
| BC-420 | Tridecyloxypoly(EO) ethanol | — | N | GAF | liq |
| BC-610 | same as above | — | N | GAF | liq |
| NEKAL NF | Na+ alkylnaphthalenesulfonate | — | A | GAS | liq |
| NEKAL WT-27 | sulfonated aliphatic polyester | — | A | GAS | 70% l |
| IGEPAL CA-210 | octylphenoxypoly(EO) ethanol | 3.5 | N | GAF | liq |
| IGEPAL CA-420 | same as above | 8.0 | N | GAF | liq |
| IGEPAL CA-520 | same as above | 10.0 | N | GAF | liq |
| IGEPAL CA-620 | same as above |  | N | GAF | liq |
| IGEPAL CA-630 | same as above | 13.0 | N | GAF | liq |
| IGEPAL CO-210 | Nonylphenoxypoly(EO) ethanol | 4.6 | N | GAF | liq |
| IGEPAL CO-890 | same as above | 17.8 | N | GAF | s |
| IGEPAL CO-990 | same as above | 19.0 | N | GAF | s |
| IGEPAL RC-520 | phenoxypoly(EO) ethanol | 12.0 | N | GAF | liq |
| IGEPAL RC-620 | same as above | 10.0 | N | GAF | liq |
| IGEPAL RC-630 | same as above | 12.7 | N | GAF | liq |
| IGEPAL DM-430 | Dialkylphenoxypoly(EO) ethanol | 9.4 | N | GAF | liq |
| IGEPAL DM-530 | same as above | 10.6 | N | GAF | liq |
| IGEPAL DM-710 | same as above | 13.0 | N | GAF | liq |
| IGEPON T-33 | Na+ n-methyl-n-oleoyl taurate | — | A | GAF | liq |
| ALIPAL CD-128 | NH₄+ ethoxylate sulfate | — | A | GAF | 58% l |
| ALIPAL AB-436 |  |  |  | GAF | liq |
| ANATROX BL-214 | Aliphatic polyether | — | N | GAF | liq |
| ANTARA HR-719 | acid ester | — | — | GAF | liq |
| ANTARA CE-700 | acid ester | — | — | GAF | liq |
| ANTARA LK-500 | complex phosphate ester | — | A | GAF | liq |
| ANTARA LM-400 | acid ester | — | — | GAF | liq |
| ALFONIC 1012-60 | Ethoxylate | 12.0 | N | Conoco | liq |
| ALFONIC 1412-70 | /1214-70 |  | N | Conoco | liq |
| SURFONIC LF-17 | Alkyl polyoxyalkylene ether | 12.2 | N | Texaco | liq |
| WITCAMIDE 5138 | an alkanolamide, R2371 | 9.5 | N | Witco | liq |
| EMPHOS PS-220 | phosphate esters | — | A | Witco | liq |
| WITCONOL 14 | Polyglycerol fatty acid ester | — | N | Witco | liq |
| EthoduomeenT13 | a fatty amine filimer |  |  | R-376 | liq |
| AMP-95 | 2-amino-2-methyl-1-propanol |  |  | R-2233 | 95% l |
| Mackamides |  |  |  |  |  |
| Oleadmide DEA | alkanolamide | — | N | McIntyr | liq |
| NOA, AZ 142 | alkanolamide | 6.5 | N | McIntyr | liq |
| NOA, BB-16 | same as above | 7.1 | N | McIntyr | liq |
| Soyamide DEA | Lot 7654, same as above | 8.1 | N | McIntyr | liq |
| KELIG 3000 | Carboxylated lignosulfonate | — | A | Reed Li | liq |
| JOY | commerical brand detergent | 20 |  |  | liq |

¹T*: Type of surfactant; A = anionic, C = cationic, N = nonionic
²M**: Manufacturer
³liq or l: Liquid

Having thus described out invention, we claim:

1. A method of improving the SO₂ scrubbing efficiency of flue gas desulfurization scrubbers which comprises conducting the scrubbing operation in such scrubbers in the presence of an oil-soluble surfactant.

2. The method of claim 1 where the oil-soluble surfactant has an HLB within the range of 1–9.

3. The method of claim 1 where the oil-soluble surfactant has an HLB within the range of 1–5.

4. A method of improving the SO₂ scrubbing efficiency of flue gas desulfurization scrubbers which comprises conducting the scrubbing operation in such scrubbers in the presence of an non-ionic oil-surfactant.

5. A method of improving the SO₂ scrubbing efficiency of flue gas desulfurization scrubbers which utilizes either lime, limestone or fly ash which comprises conducting the scrubbing operation in such scrubbers in the presence of an oil-soluble surfactant.

* * * * *